United States Patent
Tertoolen

(10) Patent No.: US 8,635,019 B2
(45) Date of Patent: Jan. 21, 2014

(54) NAVIGATION DEVICE AND METHOD FOR ALTERING MAP INFORMATION RELATED TO AUDIBLE INFORMATION

(75) Inventor: Simone Tertoolen, Rotterdam (NL)

(73) Assignee: TomTom International B.V., Amsterdam (NL)

( * ) Notice: Subject to any disclaimer, the term of this patent is extended or adjusted under 35 U.S.C. 154(b) by 330 days.

(21) Appl. No.: 12/736,433

(22) PCT Filed: May 29, 2008

(86) PCT No.: PCT/EP2008/004598
§ 371 (c)(1),
(2), (4) Date: Oct. 7, 2010

(87) PCT Pub. No.: WO2009/143872
PCT Pub. Date: Dec. 3, 2009

(65) Prior Publication Data
US 2011/0054774 A1    Mar. 3, 2011

(51) Int. Cl.
*G01C 21/00* (2006.01)
(52) U.S. Cl.
USPC .......................... 701/428; 701/429; 701/431
(58) Field of Classification Search
USPC ................. 701/410, 419, 425, 428, 429, 438
See application file for complete search history.

(56) References Cited

U.S. PATENT DOCUMENTS

| | | | |
|---|---|---|---|
| 7,463,976 B2* | 12/2008 | Nomura | 701/425 |
| 7,869,938 B2* | 1/2011 | Wako | 701/432 |
| 7,969,383 B2* | 6/2011 | Eberl et al. | 345/7 |
| 2002/0038181 A1* | 3/2002 | Okude et al. | 701/208 |
| 2002/0049534 A1* | 4/2002 | Yuda et al. | 701/209 |
| 2004/0088110 A1* | 5/2004 | Suzuki | 701/211 |
| 2004/0215390 A1* | 10/2004 | Nomura | 701/209 |
| 2005/0102102 A1* | 5/2005 | Linn | 701/210 |
| 2005/0273252 A1* | 12/2005 | Nix et al. | 701/201 |
| 2006/0247855 A1* | 11/2006 | de Silva et al. | 701/212 |
| 2008/0027632 A1* | 1/2008 | Mauderer | 701/208 |
| 2008/0167811 A1* | 7/2008 | Geelen | 701/212 |
| 2009/0012803 A1* | 1/2009 | Bishop et al. | 705/1 |

(Continued)

FOREIGN PATENT DOCUMENTS

| | | |
|---|---|---|
| CN | 1821719 A | 8/2006 |
| CN | 101046392 A | 10/2007 |
| EP | 1 860 628 | 11/2007 |
| JP | 2007-256227 | 10/2007 |

OTHER PUBLICATIONS

International Preliminary Report on Patentability dated Nov. 30, 2010.
International Serach Report.

*Primary Examiner* — Helal A Algahaim

(57) ABSTRACT

Methods and devices are disclosed for providing map information to a user via a portable navigation device. The method may include displaying map information including at least one icon and a route to a desired destination, producing audible information related to the route, and altering the at least one icon for display when the audible information relates to the at least one icon. The portable navigation device includes a display device to display map information including at least one icon and a route to a desired destination, an output device to produce audible information related to the route, and a processor to alter the at least one icon for display when the audible information relates to the at least one icon.

25 Claims, 6 Drawing Sheets

(56) References Cited

U.S. PATENT DOCUMENTS

| | | | |
|---|---|---|---|
| 2009/0030604 A1* | 1/2009 | Fujita et al. | 701/208 |
| 2009/0216431 A1* | 8/2009 | Vu et al. | 701/201 |
| 2010/0004005 A1* | 1/2010 | Pereira et al. | 455/457 |
| 2010/0004857 A1* | 1/2010 | Pereira et al. | 701/209 |
| 2010/0191457 A1* | 7/2010 | Harada | 701/201 |
| 2010/0286901 A1* | 11/2010 | Geelen et al. | 701/200 |

* cited by examiner

NAVIGATION DEVICE AND METHOD FOR ALTERING MAP INFORMATION RELATED TO AUDIBLE INFORMATION

FIELD

The present application generally relates to portable navigation devices and methods.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device. To aid in navigation of the route, map information is visually output along the route of travel to a user of the navigation device.

SUMMARY

The inventors herein have discovered that audible information directing the user along a route and including distance instructions can be difficult for a user to perceive in combination with visual map information. Thus, the inventors herein have, in at least one embodiment, devised a method, device and/or computer readable medium for altering an icon include in visual map information when the icon is related to the audible information produced from an output device of navigation device. In this manner, the user receives a combination of visual and audible information directing the user along the route.

In at least one embodiment of the present application, a method of providing map information to a user via a navigation device is disclosed. The method includes displaying map information including at least one icon and a route to a desired destination, producing audible information related to the route, and altering the at least one icon for display when the audible information relates to the at least one icon.

In at least one embodiment of the present application, a navigation device for providing map information to a user is disclosed. The navigation device includes a display device to display map information including at least one icon and a route to a desired destination, an output device to produce audible information related to the route, and a processor to alter the at least one icon for display when the audible information relates to the at least one icon.

In at least one embodiment of the present application, a navigation device for providing map information to a user is disclosed. The navigation device includes means for displaying map information including at least one icon and a route to a desired destination, means for producing audible information related to the route, and means for altering the at least one icon for display when the audible information relates to the at least one icon.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
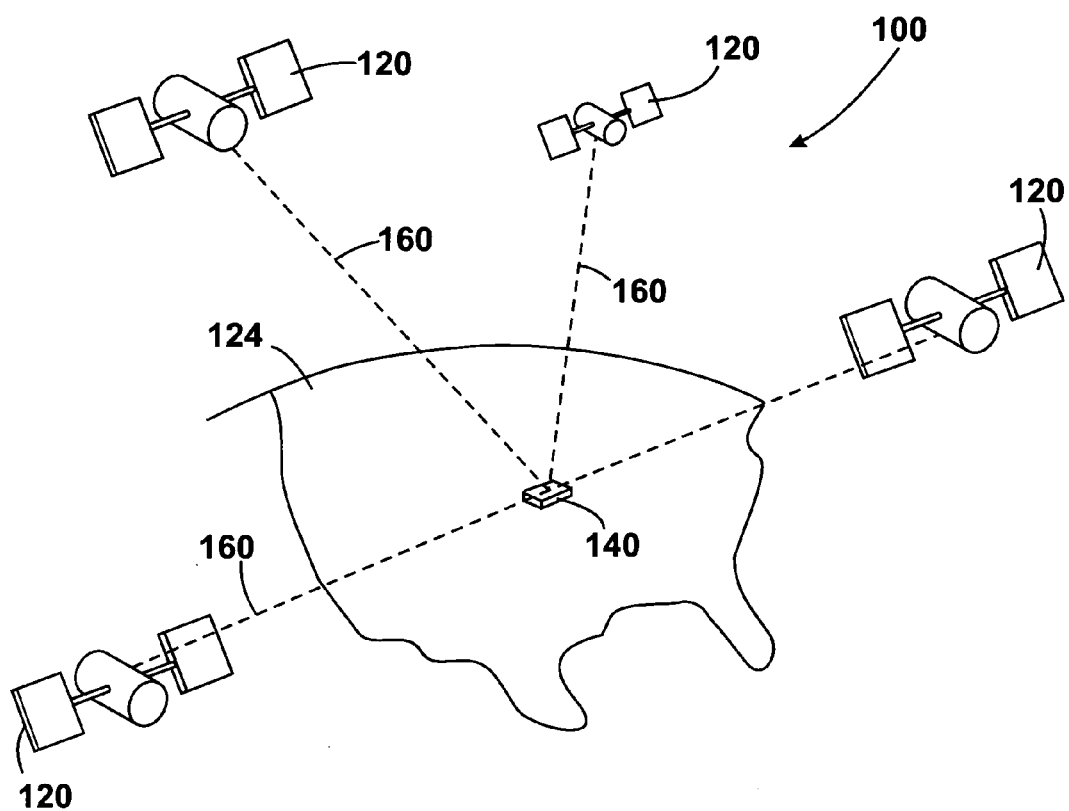
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of a Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
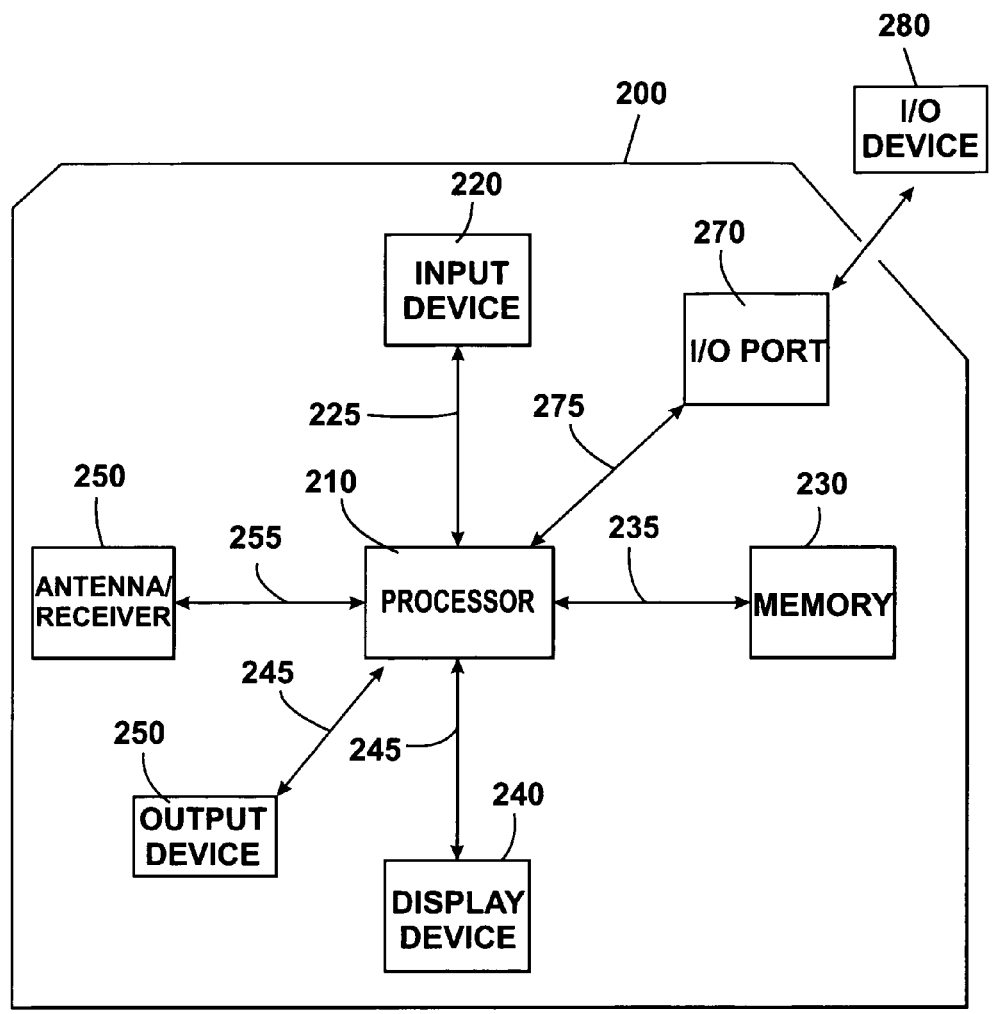
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/ receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
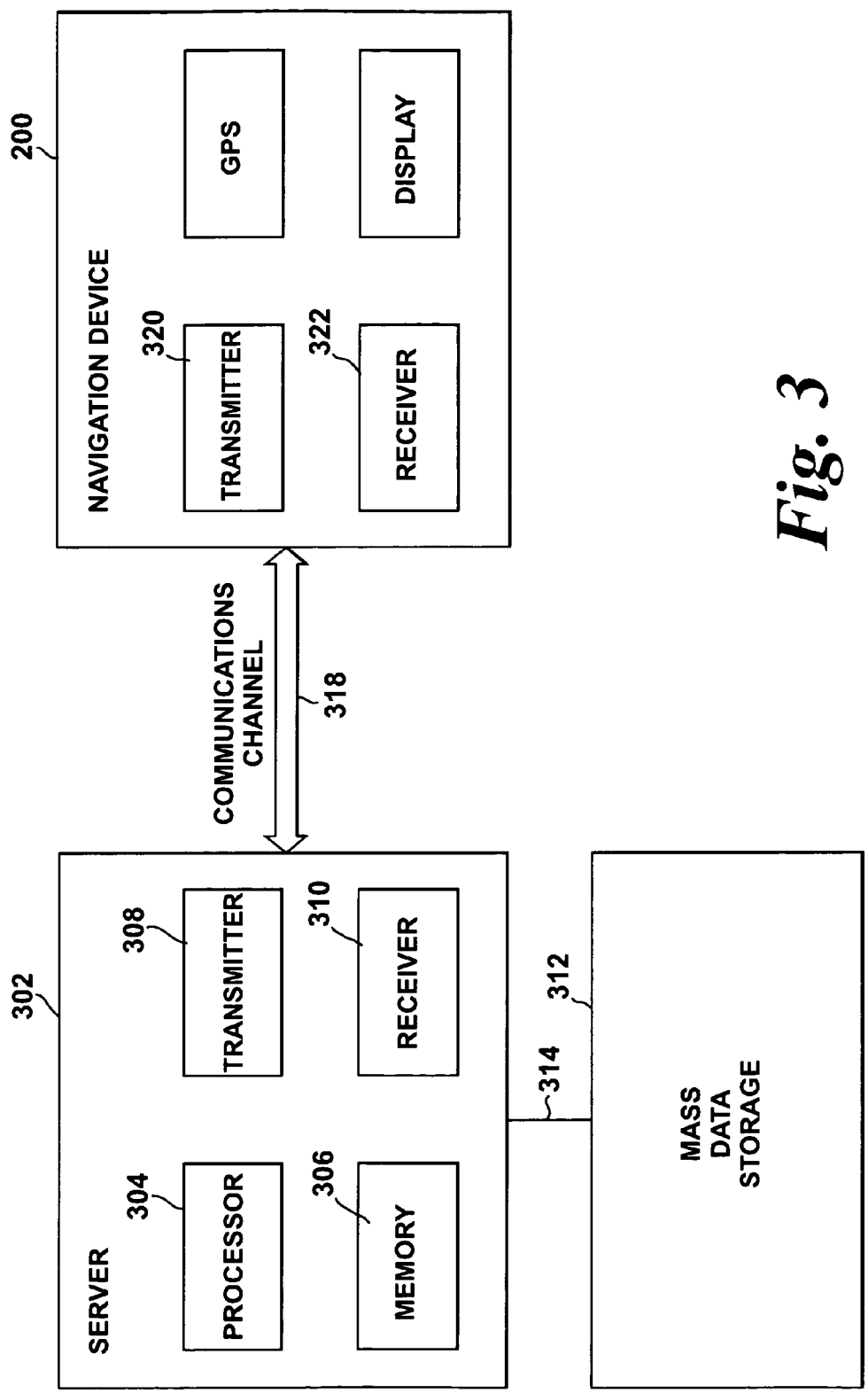
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes a processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
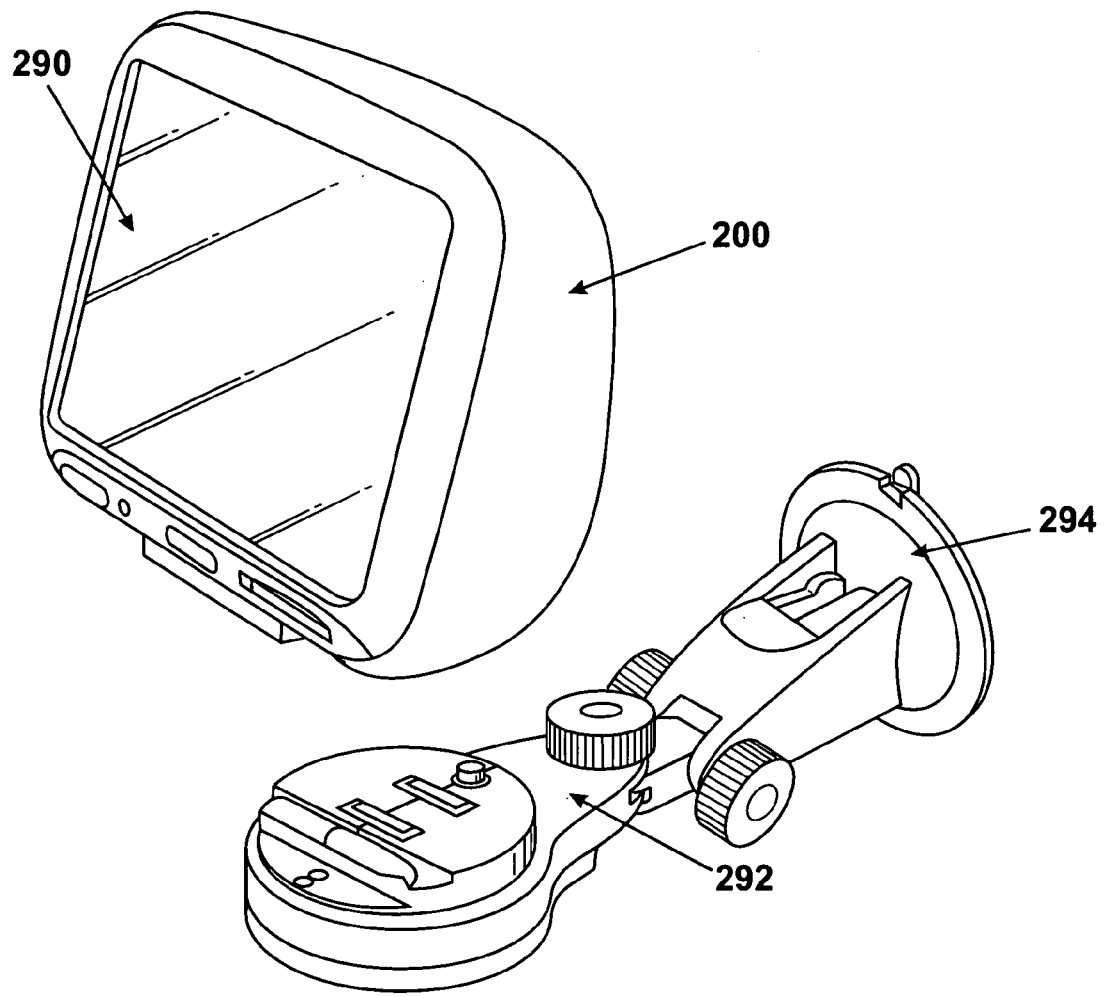
FIGS. 4A and 4B are perspective views of an implementation of an embodiment of the navigation device of FIG. 2.
Figure 4B:
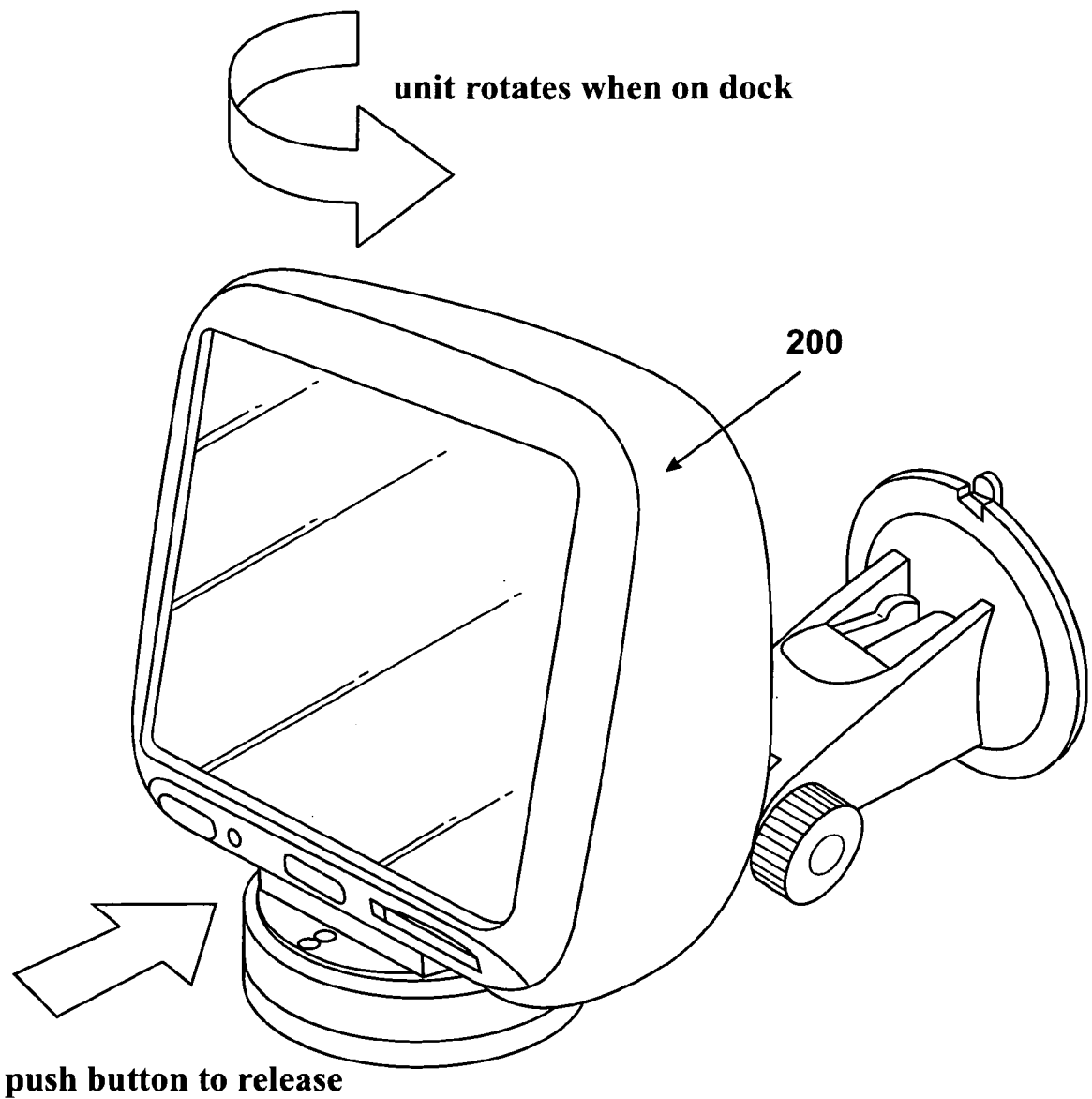

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

In at least one embodiment of the present application, a method of providing map information to a user via a navigation device 200 is disclosed. The method includes displaying map information including at least one icon and a route to a desired destination, producing audible information related to the route, and altering the at least one icon for display when the audible information relates to the at least one icon.

In at least one embodiment of the present application, a navigation device 200 for providing map information to a user is disclosed. The navigation device 200 includes a display device 240 to display map information including at least one icon and a route to a desired destination, an output device 250 to produce audible information related to the route, and a processor 210 to alter the at least one icon for display when the audible information relates to the at least one icon.

In at least one embodiment of the present application, a navigation device 200 for providing map information to a user is disclosed. The navigation device 200 includes means for displaying map information including at least one icon and a route to a desired destination, means for producing audible information related to the route, and means for altering the at least one icon for display when the audible information relates to the at least one icon.

Figure 5:
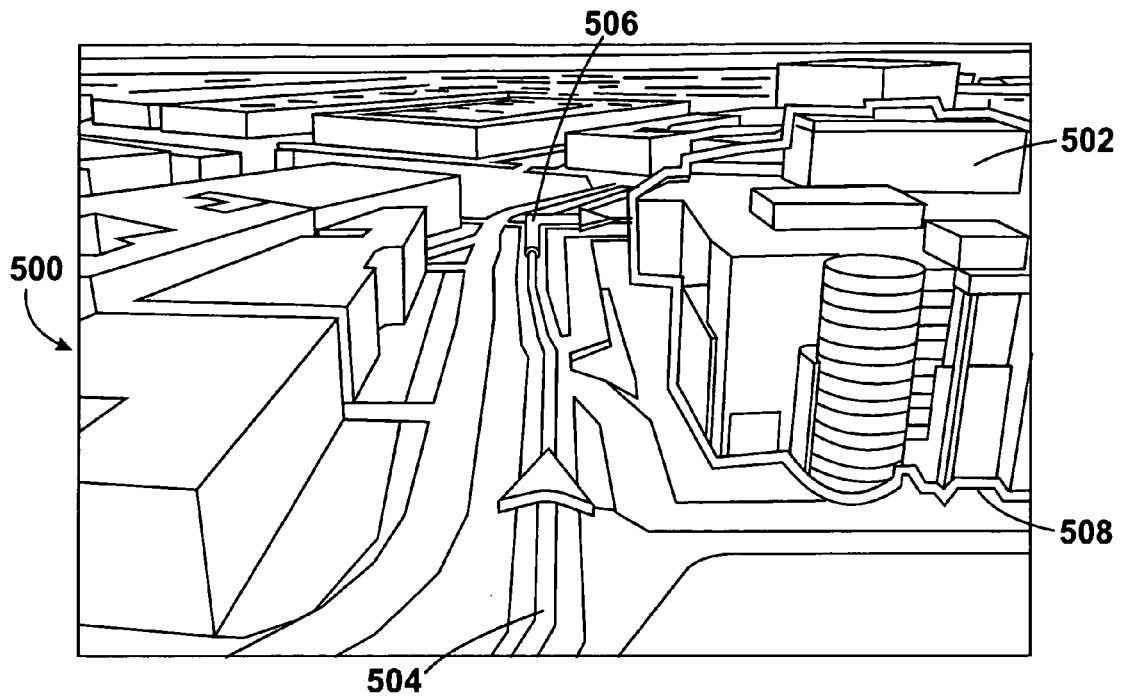
FIG. 5 illustrates an example display including an altered building according to the present application.
Figure 6:
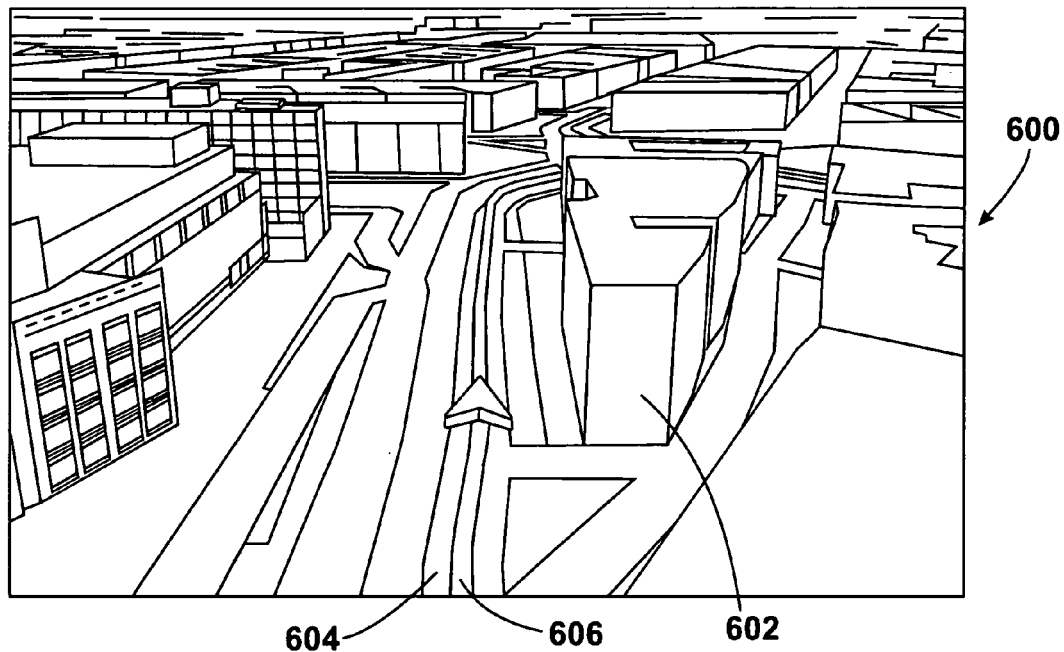
FIG. 6 illustrates an example display including a highlighted building.

FIGS. 5-6 illustrate example embodiments of the present application.

As shown in FIG. 5, an example display 500 for displaying on a display device 240 of a portable navigation device 200 is illustrated. The example display 500 illustrates map information including a building 502 and a route 504. The route 504 is between a start position (current position of the portable navigation device 200 obtained via GPS for example) and a desired destination (input or selected by a user for example). The map information also includes various buildings, roads, and waterways. As a user proceeds along the route 504, audible information may be provided in various intervals to ensure the user proceeds along the route 504. As shown in the example display 500, the route includes a right turn 506 behind the building 502. As the user proceeds toward the right turn 506, audible information is produced by the output device 250, which directs the user to "Turn left after the building." Because the audible information is related to the building 502, the processor 210 alters the building 502 for display. In this manner, the user receives both visual and audible information from the navigation device 200 in proceeding along the route 502.

In the example display 500, altering the building 502 for display includes outlining the building 502 with a green line 508 (noting that green is merely an example color and therefore embodiments of the present invention should not be considered to be limited to a green color). Based on the accurate representation of the building 502 and the green outline 508, the user may be able to equate the building 502 within the example display 500 with a building in the user's actual field of view. In this manner, the user is able to correlate the audible information and the actual building via the outlined building 502 to better understand the audible information to "Turn left after the building."

It should be appreciated that the altering can include but is not limited to employing a different shape and/or color of the outline in other embodiments of the present application. For example, a building may be outlined via a box, a rectangle, a circle, an oval, etc. (i.e., a regular shape which may be unrelated to the shape of the building). Further, the altering can include but is not limited to altering thickness and/or color of an outline (to therefore differentiate the building, or other object being audibly conveyed, from other displayed buildings for example) depending on other map information, a preprogrammed setting, and/or user preferences. Further still, the altering can include but is not limited to altering an outline in a different format in other embodiments of the present application (e.g., dashed line, a dotted outline, etc.).

In at least one embodiment of the present application, altering an icon for display may include but is not limited to highlighting, coloring, glowing, and/or shading the icon. As shown in FIG. 6, map information in example display 600 includes a hospital 602, Main Street 604, and a route 606. As a user proceeds along the route 606, audible information may instruct the user to "Proceed along Main Street past the Hospital." As audible information is produced by the navigation device 200, the processor 210 of the navigation device 200 is then triggered to alter building 602 for display by, for example, highlighting the building 602 as shown in FIG. 6. The triggering or otherwise instructing of the processor 210 may be, for example, based upon an association or correlation between a displayed icon and the audible information to be output (the association or correlation be stored/flagged for example in memory 230 and/or determined by processor 210 upon recognizing that the upcoming instructing of audible output of information relates to a displayed icon). The highlighting of the hospital 602 can then be achieved by the processor 210 in a known manner, once triggered. In this manner, the user can then correlate the highlighted hospital 602 and the audible direction to proceed past the hospital. When the user proceeds past the hospital 602, the highlighting of the hospital 602 may be removed by the processor 210 such that if subsequent map information includes the hospital 602, the hospital 602 will not be highlighted (unless again related to subsequent audible information).

In this particular embodiment, the hospital 602 is highlighted by a relatively slightly brighter color change, as compared to other buildings included in the map information of example display 600. In this manner, the hospital 602 may be correlated with the audible information with little change to the map information included in example display 600. It should be appreciated that the degree and/or color of highlighting in other embodiments of the present application may be different, depending on the implementation of other map information displayed on a navigation device, a preprogrammed setting, and/or user preferences. For example, in an alternate embodiment of example display 600, the hospital 602 may be highlighted by a relatively darker color change.

In at least one embodiment of the present application, altering an icon for display may include animating the icon. Animating the icon may include adding movement to the icon when audible information related to the icon is produced from an output device 250 of a navigation device 200. For example, an icon representing a favorite location may be a star, which then may be animated when audible information related to the icon is produced from an output device 250 of a navigation device 200. The triggering or otherwise instructing of the processor 210 to animate an icon may be, for example, based upon an association with the audible information to be output (stored for example in memory 230), but the animating of the hospital 602 can be achieved by the processor 210 in a known manner, once triggered.

Animation of the star may include spinning the star over the favorite location, for example. It should be appreciated that in other embodiments of the present application, different types of animation may be included as appropriate for a particular icon. For example, a flag may be animated to appear to "wave in the wind."

In at least one embodiment of the present application, altering an icon included in map information displayed on a display device 240 may include altering the icon to flash and/or blink on the display. For example, the processor 210 may control (in a known manner) an icon representing an off-ramp to be flashed and/or blinked for display, when audible information related to the off-ramp is produced from an output device 250 of a navigation device 200. The flashing may included repeatedly coloring and un-coloring the off-ramp in a slightly relatively lighter or relatively darker shade of its native color. In another example, altering an icon for display may include flashing the icon on and off, rather than in coloring the icon.

In at least one embodiment of the present application, altering an icon may include the processor 210 sizing the icon (or varying the size for display). Sizing the icon may include the processor 210 (in a known manner) making the icon relatively larger or relatively smaller for display when audible information related to the icon is produced from an output device 250 of a navigation device 200. For example, in combination with audible information related to an icon, the icon of a landmark may be enlarged for display by a certain percent (e.g., about 10-20%) by the processor 210. By increasing the size of the landmark, a user may associate the enlarged landmark with the audible information to aid in following one or more instructions included in the audible information. In an alternate example, map information surrounding the landmark may be reduced in size by a certain percent (e.g., about 10-20%) such that additional detail of the landmark may be visible. In this manner, more detail about the landmark is displayed, potentially increasing the likelihood that the user will identify the real landmark and correctly follow one or more instructions included in the audible information related to the landmark. It should be appreciated that a different percentage sizing may be employed in other embodiments of the present application depending on one or more of map information displayed on a navigation device 200, a preprogrammed setting, and user preferences.

An icon to be altered for display by the processor 210 may represent any object including travel content of an actual view of the area represented by the map information. An object may include, for example, travel content, a point of interest or another object within the field of view or information regarding a route displayed by a portable navigation device 200. Travel content may include for example, but is not limited to, any one or more of a start point, a present location, a desired destination, any point along a route (e.g., rest stop), road types (e.g. highway, bicycle path, etc.), parts of a road (e.g., exit ramps, roundabout, etc.), traffic equipment (e.g., a traffic light, a traffic camera, a sign, etc.), bridges, tunnels, railway lines, tram lines, a water types (e.g., seas, oceans, lakes, rivers, canals, waterways, etc.), ort any other.

A point of interest may generally be understood to be a location, place and/or event that a person may find useful or interesting. For example, a point of interest may include a landmark, which may include, but is not limited to, any object within the map information, which includes a distinctive size, shape, and/or location sufficient for a user to become familiar.

The landmark may be personal (e.g., home, home of friends/family, favorite locations, or another object of special interest to a user) or generic (e.g., a famous cathedral). Further, a point of interest may include for example, but is not limited to, any one of a government office, a mountain peak, open parking, a parking garage, a petrol/gas station, a railway station, a rest area, an airport, a car dealership, a casino, a church, a cinema, a city centre, a company, a concert hall, a courthouse, a cultural centre, a exhibition centre, a ferry terminal, a border crossing, a golf course, a hospital/clinic, a hotel, a motel, a tourist attraction, a mountain pass, a museum, an art gallery, an opera house, an opera, a place of worship, a post office, a shipping company, a car rental facility, a restaurant, a shop, a mall, a shopping centre, a stadium, a sports arena, a theater, a tourist information office, a zoo, a sports center, a police station, a firehouse, an embassy, a college or university, a cash dispenser, a beach, an ice skating rink, a tennis court, a water sport, a doctor, a dentist, a veterinarian, nightlife, an amusement park, a library, a car repair/garage, a pharmacy, a scenic view, a panoramic view, a swimming pool, a winery, a distiller, a camping ground, a park and recreation area, a convention center, a leisure centre, a marina, a yacht basin, a postcode, a legislator, a lawyer, a solicitor, a counselor, etc. A point of interest may be received from a user and/or may be included in a pre-programmed and/or routinely programmed catalog stored in memory associated with a navigation device 200.

In at least one embodiment of the present application, an icon included in map information may be displayed as three-dimensional. Referring to FIG. 5, the building 502 included in the map information is an example of a three-dimensional representation of the actual building within the field of view. The three-dimensional building 502 is outlined with a green line 508, based on related audible information. It should be appreciated that in at least one other embodiment of the present application, an icon may be two-dimensional and subsequently altered when audible information related to the two-dimensional icon.

In at least one embodiment of the present application, a method of providing map information to a user via a navigation device 200 may include receiving at least one of an input and a selection representing the desired destination. Subsequently, the navigation device 200 may plan or determine a route between a current location of the navigation device 200 and the desired destination. In some embodiments of the present application, a user may be further prompted to select a shortest route, a quickest route, or another option that may affect the route provided to the user. For example, a navigation device 200 may receive a user input indicating a shortest route preference, and the navigation device 200 may display a route with including the shortest distance between a current location of the navigation device 200 and a desired destination. In this example, a shortest route may include more side-street (relatively slower speed limit) than a quickest route, which may include more highways (relatively faster speed limit).

In at least one embodiment of the present application, a method of providing map information to a user via a navigation device 200 may include generating audible information related to the at least one icon based on a route. When the navigation device 200 displays a route on display device 240, the navigation device 200 also may generate audible information, in a known manner, to instruct the user along the route. The audible information may be dynamically generated to relate to the route. When the navigation device 200 generates audible information including a reference to an icon based on the route, the correlated/associated icon may be altered for display by the processor 210, via a method of at least one embodiment described above, to draw the user's attention to the icon and the object corresponding to the icon in his/her field of view. In this manner, the user receives both visual and audible information from the navigation device 200. In one example, a processor 210 generates audible information related to the at least one icon. In at least one other embodiment of the present application, rather than generated by the navigation device 200, audible information may be retrieved from a pre-processed database, stored locally or remotely.

The embodiment of the present application discussed above included a navigation device 200, which is a portable navigation device. However, the embodiments, methods and devices explained above are not limited as such. Aspects, embodiments, methods and devices explained above are further applicable to a navigation device, which is integrated into a vehicle. Such a navigation device may be, for example, integrated into a dashboard or other portion of a vehicle. Such a vehicle may include, but is not limited to a car, truck, boat, motorcycle, etc. In at least one embodiment, such a navigation device integrated in a vehicle may be used to perform the various aspects of the method described with regard to FIGS. 5-6, as would be understood by one of ordinary skill in the art. Thus, further explanation is omitted for the sake of brevity.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor 210 or other computer device. In varying embodiments, the medium may be a magnetic medium, electronic medium, optical medium, etc.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of providing map information to a user via a navigation device, the method comprising:
   displaying map information including at least one icon and a route to a desired destination;
   producing audible information related to directing the user along the route using the navigation device;
   associating at least a part of the audible information with the at least one icon;
   altering the at least one icon for display, wherein the alteration of the at least one icon is triggered when the at least a part of the audible information relates to the at least one icon; and
   displaying the map information including the at least one altered icon and the route to the desired destination using the navigation device.

2. The method of claim 1, wherein the altering of the at least one icon includes at least one of highlighting, coloring, outlining, varying brightness and shading of the at least one icon for display.

3. The method of claim 1, wherein the altering of the at least one icon includes at least one of flashing and altering a size of the at least one icon for display.

4. The method of claim 1, wherein the altering of the at least one icon includes animating the at least one icon for display.

5. The method of claim 1, wherein the at least one icon represents at least one of travel content and a point of interest.

6. The method of claim 1, wherein the at least one icon includes a plurality of icons along the route.

7. The method of claim 1, further comprising generating audible information related to the at least one icon based on the route.

8. The method of claim 7, further comprising receiving at least one of an input and a selection representing the desired destination.

9. The method of claim 1, wherein the at least one icon is displayed three-dimensionally.

10. A navigation device for providing map information to a user, the navigation device comprising:
    a display device to display map information including at least one icon and a route to a desired destination;
    an output device to produce audible information related to directing the user along the route; and
    a processor to:
        associate at least a part of the audible information with the at least one icon; and
        alter the at least one icon for display, wherein the alteration of the at least one icon is triggered when the at least a part of the audible information relates to the at least one icon.

11. The navigation device of claim 10, wherein the processor, to alter the at least one icon when the audible information relates to the at least one icon, includes controlling the display to at least one of highlight, shade, color, vary brightness and outline the at least one icon.

12. The navigation device of claim 11, wherein the at least one icon represents at least one of a point of interest and travel content.

13. The navigation device of claim 11, wherein the at least one icon is for three-dimensional display.

14. The navigation device of claim 10, wherein the processor, to alter the at least one icon when the audible information relates to the at least one icon, includes controlling the display to at least one of flash, vary a size and animate the at least one icon.

15. The navigation device of claim 10, wherein the processor controls the generation of audible information related to the at least one icon based on the route.

16. The navigation device of claim 15, wherein the navigation device is a portable navigation device.

17. The navigation device of claim 10, wherein the navigation device is integrated into a vehicle.

18. A navigation device for providing map information to a user, the navigation device comprising:
    a display;
    a memory storage unit;

a processor;
means for displaying map information including at least one icon and a route to a desired destination;
means for producing audible information related to directing the user along the route to a user;
means for associating at least a part of the audible information with the at least one icon; and
means for altering the at least one icon for display, wherein the alteration of the at least one icon is triggered when the at least a part of the audible information relates to the at least one icon.

19. The navigation device of claim 18, wherein the at least one icon includes multiple icons along the route.

20. The navigation device of claim 18, wherein the means for altering is for altering the at least one icon by at least one of highlighting, flashing, coloring, varying brightness, animating, outlining, shading, and changing a size of the at least one icon.

21. The navigation device of claim 20, wherein the at least one icon represents at least one of a point of interest and travel content.

22. The navigation device of claim 21, further comprising means for receiving at least one of an input and a selection representing the desired destination.

23. The navigation device of claim 22, further comprising means for generating audible information related to the at least one icon based on the route.

24. The navigation device of claim 18, wherein the navigation device is integrated into a vehicle.

25. The navigation device of claim 18, wherein the navigation device is a portable navigation device.

* * * * *